United States Patent [19]

Russell

[11] Patent Number: 5,136,125
[45] Date of Patent: Aug. 4, 1992

[54] SENSOR GRID FOR AN ELECTROMAGNETIC DIGITIZER TABLET

[75] Inventor: Gregory F. Russell, Yorktown Heights, N.Y.

[73] Assignee: International Business Machines Corporation, Armonk, N.Y.

[21] Appl. No.: 696,434

[22] Filed: May 6, 1991

[51] Int. Cl.⁵ .............................................. G08C 21/00
[52] U.S. Cl. ...................................................... 178/19
[58] Field of Search ................. 379/19, 18, 87; 178/19

[56] References Cited

U.S. PATENT DOCUMENTS

| | | |
|---|---|---|
| 3,801,733 | 4/1974 | Bailey . |
| 3,974,332 | 8/1976 | Abe et al. . |
| 4,054,746 | 10/1977 | Kamm . |
| 4,081,603 | 3/1978 | Davis et al. . |
| 4,178,481 | 12/1979 | Kley . |
| 4,185,165 | 1/1980 | Fencl . |
| 4,210,775 | 7/1980 | Rodgers et al. . |
| 4,213,005 | 7/1980 | Cameron . |
| 4,240,065 | 12/1980 | Howbrook . |
| 4,378,465 | 3/1983 | Green et al. . |
| 4,397,033 | 8/1983 | Bechet . |
| 4,418,242 | 11/1983 | Kouno . |
| 4,423,286 | 12/1983 | Bergeron . |
| 4,451,698 | 5/1984 | Whetstone et al. . |
| 4,471,162 | 9/1984 | Aono et al. . |
| 4,507,523 | 3/1985 | Gohara et al. . |
| 4,552,991 | 11/1985 | Hulls . |
| 4,560,830 | 12/1985 | Perl . |
| 4,577,058 | 3/1986 | Collins . |
| 4,582,955 | 4/1986 | Blesser . |
| 4,616,106 | 10/1986 | Fowler et al. . |
| 4,617,515 | 10/1986 | Taguchi et al. . |
| 4,634,973 | 1/1987 | Murakami et al. . |
| 4,644,102 | 2/1987 | Blesser et al. . |
| 4,658,373 | 4/1987 | Murakami et al. . |
| 4,661,656 | 4/1987 | Rodgers et al. . |
| 4,678,869 | 7/1987 | Kable . |
| 4,678,870 | 7/1987 | Taguchi et al. . |
| 4,694,124 | 9/1987 | Blesser . |
| 4,697,244 | 9/1987 | Murakami et al. . |
| 4,705,919 | 11/1987 | Dhawan . |
| 4,728,944 | 3/1988 | Tamaru et al. . |
| 4,734,546 | 3/1988 | Landmeier . |
| 4,736,073 | 4/1988 | Abernethy . |
| 4,740,660 | 4/1988 | Kimura . |
| 4,771,138 | 9/1988 | Dhawan . |
| 4,810,838 | 3/1989 | Ichinokawa et al. . |
| 4,831,566 | 5/1989 | Matthews et al. . |
| 4,848,496 | 7/1989 | Murakami et al. . |
| 4,859,814 | 8/1989 | Sciacero et al. . |
| 4,890,096 | 12/1989 | Taguchi et al. . |
| 4,948,926 | 8/1990 | Murakami et al. . |
| 4,963,703 | 10/1990 | Phillips et al. . |
| 4,975,546 | 12/1990 | Craig ..................................... 178/19 |

FOREIGN PATENT DOCUMENTS

| | | |
|---|---|---|
| 57-197639 | 12/1982 | Japan . |
| 60-75922 | 4/1985 | Japan . |
| 60-135819 | 7/1985 | Japan . |
| 60-163127 | 8/1985 | Japan . |
| 63-295901 | 12/1988 | Japan . |
| 63-295902 | 12/1988 | Japan . |
| 2124773 | 7/1983 | United Kingdom . |

Primary Examiner—Stafford D. Schreyer
Attorney, Agent, or Firm—Perman & Green

[57] ABSTRACT

A digitizer tablet (10) having an array of conductors that define a sensing plane (12) for sensing an electromagnetic signal generated by a pointing device (16) disposed external to the plane. The tablet includes circuitry, coupled to the array of conductors, for determining a magnitude of an electrical signal or signals induced within the array of conductors by the pointing device. The tablet also includes a data processor (30) that is responsive to the determined magnitude for accurately estimating both a position and an angular orientation of the pointing device relative to a coordinate system associated with the sensing plane. The array of conductors is comprised of an x-axis sensor array (14a) and a y-axis sensor array (14b). Each sensor array includes a plurality of differentially interconnected and overlapping coil pairs. Each coil of a coil pair includes a major loop having auxiliary loops coupled to each end thereof for compensating for unmeasured magnetic fields beyond an end of the coil.

44 Claims, 6 Drawing Sheets

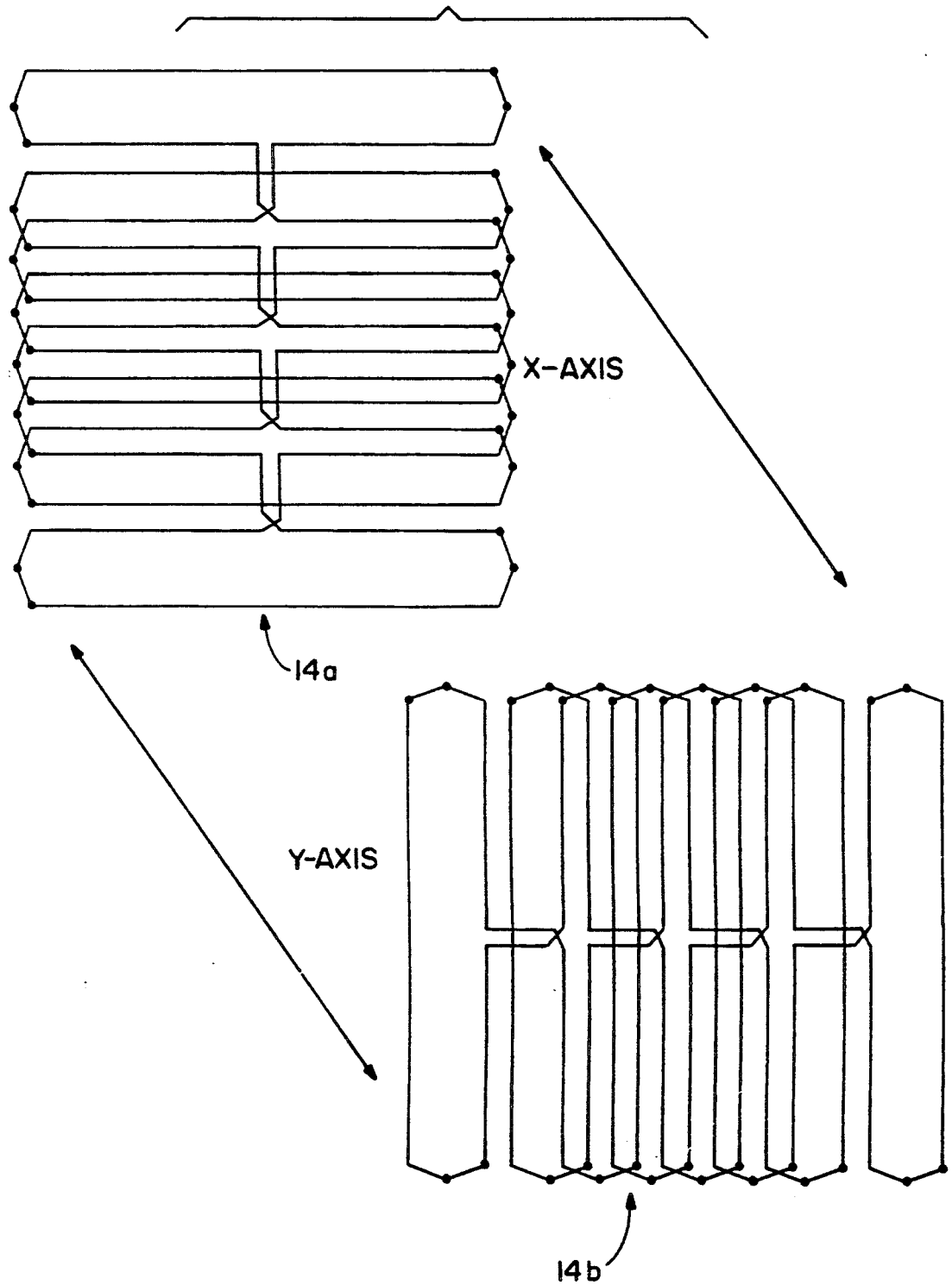

SENSOR GRID FOR AN ELECTROMAGNETIC DIGITIZER TABLET

FIELD OF THE INVENTION

This invention relates generally to electromagnetic (EM) digitizing apparatus and, in particular, to an EM digitizer coil grid sensor array.

BACKGROUND OF THE INVENTION

A number of types of EM digitizers or digitizer tablets are known in the art. In general, a digitizer tablet provides an indication of a position of a probe with respect to a surface of a planar sensor grid. One type of digitizer tablet operates by sensing a magnetic field and includes two sets of array conductors, with one set being orthogonally oriented to the other set. In this type of system the probe is driven with an AC signal to cause an oscillating magnetic field which induces signals in the array conductors. The signals in the array conductors are sensed and compared so as to determine the position of the probe in two dimensions, relative to the surface of the tablet.

Other types of digitizer tablets are also known, such as tablets that drive the array conductors and sense the field with the probe. Tablets that operate with electric fields and resistive bridges are also known. Tablets that include magnetostrictive elements are also well represented in the prior art.

The magnetic field sensing tablet is of particular interest herein. More specifically, this type of tablet measures a mutual inductance of a pair of coils. One of the pair of coils is located within the tablet and the other pair is located within the probe, also referred to herein as a stylus or pen. The pen may be physically coupled to the tablet through one or more wires, referred to as a "tethered" pen, or may be physically decoupled from the tablet as an "untethered" pen. The untethered pen embodiment is preferred in that a more natural user interface is provided.

Many tablet sensor grid arrangements consist of sets of identical, elongated loops or coils arranged along the tablet x-axis and y-axis. One conventional method of estimating pen position is to measure the signal strengths in the coils near the pen and to estimate the location of a peak signal strength along each dimension. This is equivalent to finding a zero-crossing of the signal derivative in each dimension. Since all calculations are performed on the derivative, it is convenient to refer to measurements of the derivative. These measurements are conventionally obtained by taking the differences of signals in adjacent coils from the coil array.

One problem associated with conventional digitizer tablets relates to their use in proximity to a CRT display and the coupling of external magnetic fields into the sensor grid array. The coupling of grid coil or coils to a differential amplifier through multiplexer circuitry is a known technique for reducing common mode noise.

Another problem relates to the finite extent of the sensor grid coils that results in erroneous pen position estimations for pen positions at or approaching the edges of an active area of the sensor grid array.

The following chronologically ordered U.S. patents are representative of a significant number U.S. patents that have been issued in this technical area.

In U.S. Pat. No. 4,185,165, issued Jan. 22, 1980, entitled "Low Noise System and Method for Sequentially Sensing Induced Signals in Digitizer Grid Conductors" to Fencl there is described a digitizing system having a pen with a coil disposed around a nose piece. A grid of conductors includes a group of parallel spaced conductors oriented in X and Y directions. A 96 KHz alternating current voltage is induced in the X and Y conductors by the pen coil and a differential amplifier is connected to the top and the bottom of a single coil through multiplexers.

In U.S. Pat. No. 4,552,991, issued Nov. 12, 1985, entitled "Absolute Position Coordinate Determining Device Employing a Single Phase Difference Measurement to Determine Cursor Position" to Hulls there is described a two dimensional digitizing system that includes at least two conducting grid systems. Each grid system has a number of windings with a first pitch distance and an equal number of windings with a second pitch distance that differs from the first pitch distance by a small increment. This technique is said to enable both coarse and fine position measurements.

U.S. Pat. No. 4,644,102, issued Feb. 17, 1987, entitled "Digitizing Tablet System" to Blesser et al. there is described a digitizing tablet that includes a differential amplifier that receives inputs from multiplexers and provides output signals to a processor. Two multiplexers and a differential amplifier are said to provide an immediate comparison between the signals on adjacent conductive elements. The resulting signal is said to be stripped of common mode noise and unwanted common mode signal, thus increasing the signal-to-noise ratio.

In U.S. Pat. No. 4,736,073 issued Apr. 5, 1988, entitled "Noise-Canceling System for a Digitizing Tablet" to Abernethy there is described a digitizing tablet having a signal source that drives the coil in a probe with an oscillating current so that the probe generates a varying magnetic field. The field induces electromotive force in a first set and a second set of array conductors oriented at right angles to one another. Return circuitry is provided so that a differential amplifier can amplify the signals induced in the conductors. A return circuit is provided in the vicinity of an edge of the tablet for dealing with inaccuracies due to edge effects.

In U.S. Pat. No. 4,859,814, issued Aug. 22, 1989, entitled "Noise Cancelling in Digitizing System and Method" to Sciacero et al. there is described a digitizing system said to detect and cancel ambient noise from detected grid carrier signals before processing the grid carrier signals to compute the coordinates of a pointing device. A differential noise reduction technique is disclosed. When a grid conductor is selected for sensing, another grid conductor that is located a certain number of grid conductors away is also selected as a reference conductor of a pair of differentially sensed grid conductors.

What is not taught by this prior art, and what is thus an object of the invention to provide, is an improved digitizer tablet that employs arrays of differentially connected coil pairs for achieving a significant rejection of common mode noise signals, while reducing multiplexer complexity.

A further object of the invention is to improve accuracy near the boundaries of a digitizer tablet by compensating for the finite extent of the sensor grid coils.

SUMMARY OF THE INVENTION

The foregoing and other problems are overcome and the objects of the invention are realized by a digitizer tablet having an array of inductors that define a sensing plane for sensing an electromagnetic signal generated by a pointing device disposed external to the plane. The tablet includes circuitry, coupled to the array of inductors, for determining a magnitude of an electrical signal or signals induced within the array of inductors by the pointing device. The tablet also includes a data processor that is responsive to the determined magnitude for accurately estimating both a position and an angular orientation of the pointing device relative to a coordinate system associated with the sensing plane.

In one embodiment of the invention the array of inductors is comprised of a first array defining an x-axis sensor array and a second array defining a y-axis sensor array. The x-axis sensor array and the y-axis sensor array are each comprised of a plurality of differentially interconnected coil pairs providing common-mode rejection of external noise. Individual ones of the interconnected coil pairs of each array overlap one another. Each coil of a coil pair includes a major loop having a first end having a first set of auxiliary loops coupled thereto, and a second, opposing end having a second set of auxiliary loops coupled thereto. The sets of auxiliary loops are disposed adjacent to a periphery of the array of conductors for reducing distortion of the measurements due to the finite extent of the grid coils. In one embodiment each set of auxiliary loops includes three positive windings.

An embodiment of a coil grid sensor array is disclosed that employs a printing technique to pattern electrically conductive ink so as to fabricate the x-axis and y-axis sensor grids. The grids are printed upon one side of a substrate, such as a glass-epoxy printed circuit board, and the opposite side of the substrate is provided with a metalic plane that serves as a magnetic shield. The printing technique results in both the x-axis and the y-axis sensor grids being disposed at substantially the same distance from the conductive plane to exhibit an approximately equal amount of signal attenuation due to the close proximity of the conductive plane. The use of the conductive shield improves the signal-to-noise ratio by enhanced cancellation of spatially broad noise fields.

BRIEF DESCRIPTION OF THE DRAWING

The above set forth and other features of the invention are made more apparent in the ensuing Detailed Description of the Invention when read in conjunction with the attached Drawing, wherein:

FIG. 2 illustrates a sensor grid comprised of two sets of overlapping, differentially connected coil pairs, the coil pairs of one set being orthogonally disposed relative to the coil pairs of the other set;

FIG. 3b illustrates in greater detail the geometry of one of the auxiliary loops shown in FIG. 3a;

FIG. 3c illustrates an alternative coil pair geometry that provides equivalent electrical performance to the coil pair geometry of FIG. 3a;

FIG. 4b is a partial elevational view, not to scale, of the digitizer tablet embodiment of FIG. 4a;

DETAILED DESCRIPTION OF THE INVENTION

Figure 1:
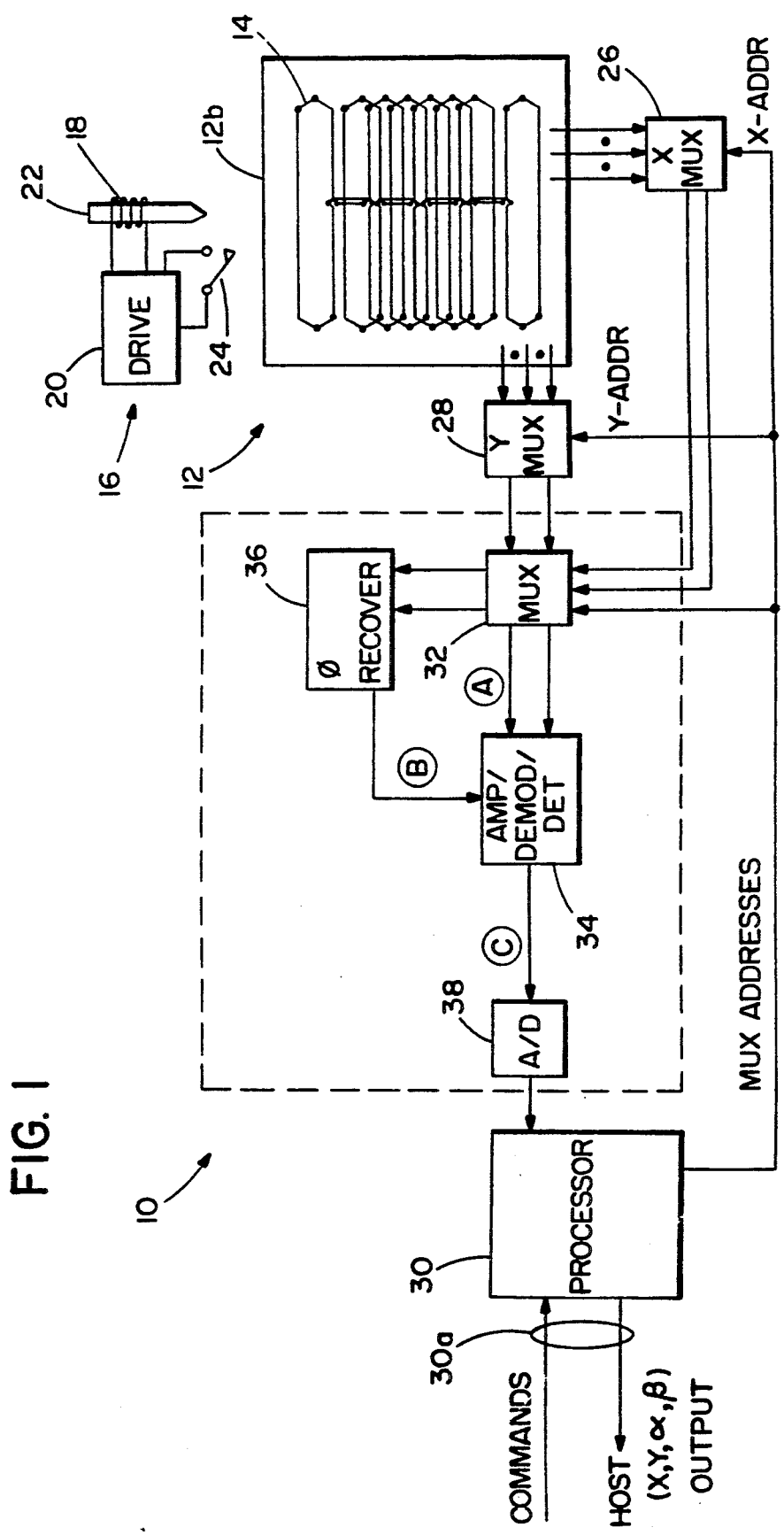
FIG. 1 is a block diagram of a digitizer tablet that is constructed and operated in accordance with the invention.

Referring to FIG. 1 there is shown in block diagram form a digitizer tablet 10. Tablet 10 includes a sensor grid 12 comprised of two superimposed coil pair arrays 14, the coil pairs of one array 14 being orthogonally disposed relative to the coil pairs of the other array. In accordance with one aspect of the invention the individual coils of each coil pair ar differentially connected to one another. In FIG. 1 only one array 14 of coil pairs is illustrated. During use, a pen 16 generates an electromagnetic signal that is sensed by the sensor grid 12.

The pen 16 includes an inductive coil 18 and a coil drive circuit 20. Coil 18 is typically wrapped around a ferrite core 22. A contact switch 24 is normally employed for indicating when the tip of the pen 16 contacts an upper surface of the sensor grid 12. For an untethered type of probe the drive circuit 20 may also include means for encoding the switch open/closed information for transmitting this information for reception by the sensor grid 12.

By example, the inductance of each coil pair within the sensor grid 12 is approximately 0.1 to approximately 1.0 microhenries, for a coil that is one centimeter in width and approximately 20 centimeters in length, and the inductance of the pen coil 18 is approximately 100 to approximately 200 microhenries.

FIG. 2 illustrates the orthogonal orientation of an x-axis sensor array 14a relative to a y-axis sensor array 14b within the sensor grid 12. Each of the sensor arrays 14 may be identical in construction. The overlap between adjacent coil pairs is not required, but is preferred in that received signal strength is increased because individual coils may be made wider, while maintaining the same coil pitch, or center-to-center spacing, between adjacent coils.

Figure 3A:
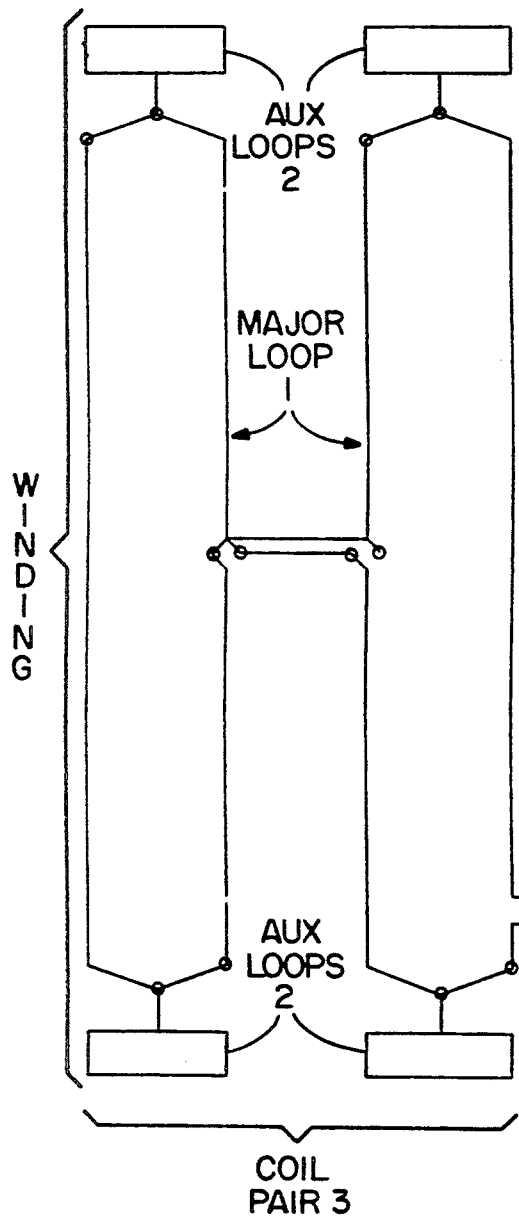
FIG. 3a illustrates in greater detail one embodiment of a differential coil pair that includes auxiliary loops at an end of each coil for compensating for edge effects that occur near the edges of the sensor grid.

FIG. 3a illustrates a presently preferred embodiment of one coil pair 3 of one of the sensor arrays 14a or 14b. As employed herein a coil pair is considered to include two interconnected coils. In accordance with an aspect of the invention the two coils ar differentially interconnected to achieve a reduction in common-mode noise and interference. Each coil is comprised of one or more windings each of which, in turn, is comprised of at least one loop. A loop is a single turn of conductor that encloses an area. Further in accordance with an aspect of the invention a winding preferably includes a major loop 1 and a plurality of auxiliary loops 2 positioned at each end of the major loop 1.

Figure 3B:
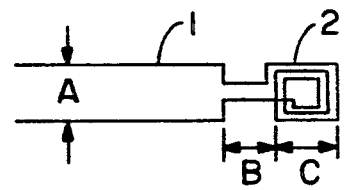

One presently preferred construction of the auxiliary loops 2 is shown in FIG. 3b. By example, the width of a coil (dimension A) is approximately one centimeter as are the dimensions (B) and (C). The overall length of the coil pair 3, including the major loops and the auxiliary loops, is a function of the required tablet size. A value of 20 cm to 30 cm is typical.

As will be described in further detail, the auxiliary loops 2 are employed to predict the magnetic field strength beyond the extent of a finite length coil, thereby compensating for the finite extent of the coil.

Tablet 10 further includes an x-axis multiplexer 26 and a y-axis multiplexer 28 that receive inputs from coil pairs of the x-axis sensor array 14a and the y-axis sensor array 14b, respectively. The coil pairs may be directly coupled to the inputs of the multiplexers 26 and 28 or they may be coupled through impedance matching transformers. A particular coil pair is selected by means of a Y address signal (YADDR) and a second coil pair by means of an X address signal (XADDR), both of which are generated by a processor 30. The signal outputs from the selected y-axis coil pair and the selected x-axis coil pair are provided to a multiplexer 32. If the processor 30 is selecting one of the x-axis coil pair signals to be provided to an amplifier/demodulator/detector (ADD) block 34, a y-axis coil pair signal is selected and provided to a clock phase recovery circuit 36. Conversely, if the processor 30 is selecting one of the y-axis coil pair signals to be provided to the ADD block 34; an x-axis coil pair signal is selected and provided to the phase recovery circuit 36. The phase recovery circuit 36 includes a phase-locked loop and generates a coherent detection clock (B).

Figure 5A:
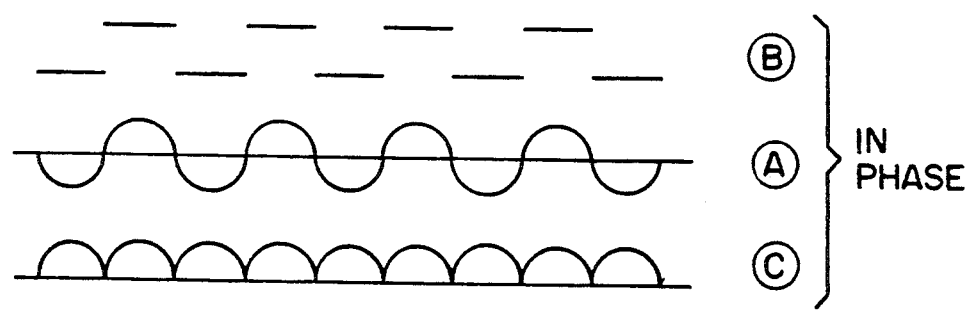
FIG. 5a shows signals that correspond to outputs of certain of the blocks of FIG. 1, and specifically shows an in-phase relationship of a coherent detection clock with respect to a signal received from the sensor grid.
Figure 5B:
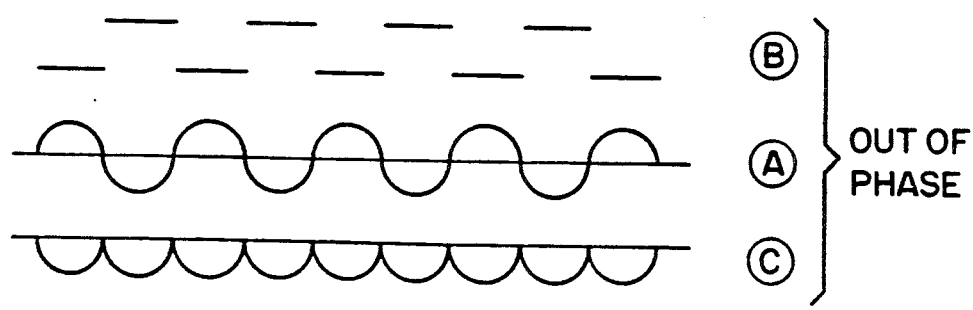
FIG. 5b illustrates signals corresponding to an out-of-phase relationship of the coherent detection clock with respect to the signal received from the sensor grid.

Referring to FIGS. 5a and 5b, the signal designated (A) in FIG. 1 is the input to the ADD 34 from the multipiexer 32. This signal is a 500 KHz signal that may be modulated for conveying penstate information. Phase recovery circuit 36 generates a square wave signal which is the coherent detection clock (B). When the coherent detection clock is low, the corresponding portion of the A signal is inverted at the output of the ADD 34. When the coherent detection clock is in phase with the signal (A), the output signal (C) resembles a positive full-wave rectified signal as shown in FIG. 5a. When the coherent detection clock out of phase with the signal A, as shown in FIG. 5b, the output (C) resembles a negative full-wave rectified signal. The use of the coherent detection clock enables, for the differential grid embodiment, a determination if coil signal is in phase (+) or out of phase (−) with other coil signal measurements.

The signal (C) is applied to an integrating analog-to-digital (A/D) converter 38 where the magnitude and sign of the signal is converted to a digital format for inputting to the processor 30.

More specifically, the coil signal strength is represented as a signed value proportional to the amplitude of the AC voltage induced in the coil grid 12 by the pen coil 18. The signal strength has a positive sign if the induced voltage is in phase with the pen coil 18 voltage, or a negative sign if the induced voltage is out of phase with the pen coil 18 voltage.

During use, the processor 30 sequentially scans a plurality of adjacent coil pairs and measures the induced signal strengths in each coil pair. These measurements are operated upon by signal processing algorithms to arrive at an estimated pen position and pen tilt.

The processor 30 is connected to an external host by a communication line 30a, such as a conventional RS-232C serial communication line, and receives commands and set up information from the host. The processor 30 includes memory for storing programs, including programs that execute a pen position estimation. During operation the processor 30 outputs packets of information relating to the position and, if required, angular orientation of the pen 16 relative to the sensor grid 12. This information includes x-axis and y-axis pen position information and tilt information (alpha and beta) regarding the orientation of the pen relative to a sensor grid 12 x-y coordinate system.

Further regarding the improved sensor grid geometry taught by the invention; an improved S/N ratio is achieved by employing the differentially coupled coil pairs illustrated in FIG. 2 and in FIG. 3a, in which each coil includes two or more loops of opposite orientation. In this configuration the signals induced within two loops are measured simultaneously. Noise or interference sources are thus partially cancelled out, leaving only the noise gradient influences. In contrast, when loops are measured sequentially, the noise components may be uncorrelated between measurements, and add together rather than cancel.

When using such a differential grid geometry the clock (B) is recovered to perform coherent detection. This is accomplished, as previously described, by selecting one of the x-axis coil pair signals to be provided to the ADD block 34 while selecting a y-axis coil pair signal to be provided to the phase recovery circuit 36, and vice versa.

Figure 3G:
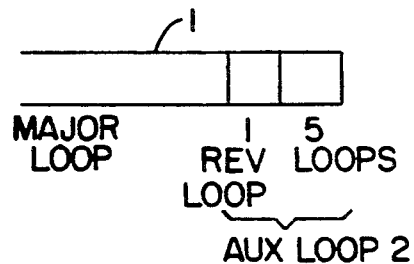
FIG. 3g illustrates an embodiment of an auxiliary loop constructed to have five forward loops and one reverse loop.
Figure 3C:
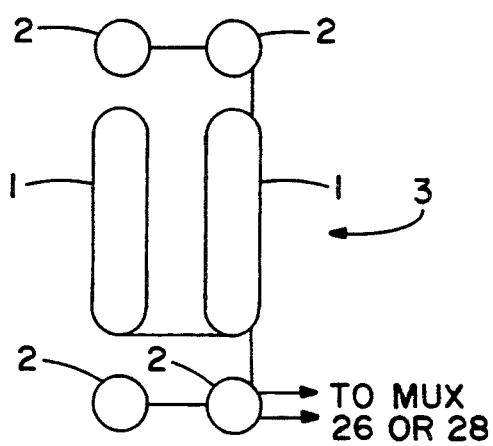

It should be noted that the illustrated sensor grid 12 is not optimized for minimizing stray inductance or for enhancing symmetry and is illustrative only of the differentially connected geometry. It is further noted that the teaching of the invention is not to be construed to be limited to any one specific coil or coil pair geometry. For example, the differentially coupled configuration illustrated in simplified form in FIG. 3c provides substantially the same electrical operation as the configuration of FIG. 3a.

Figure 3H:
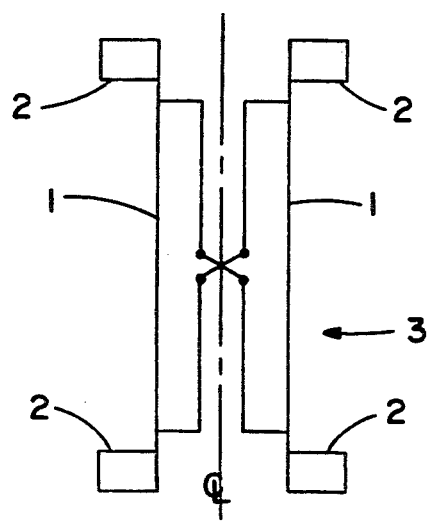
FIG. 3h illustrates another embodiment of a differential coil pair that includes auxiliary loops at an end of each coil, the auxiliary loops being offset from a longitudinal axis of symmetry of the major loops.
Figure 3D:
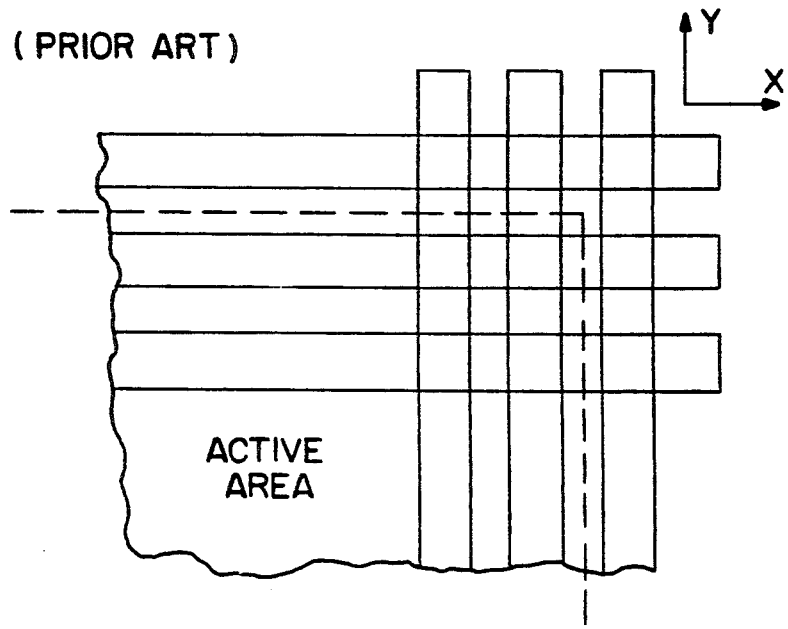
FIG. 3d illustrates sensor grid coils arranged in accordance with the prior art.

In accordance with an aspect of the invention the use of the auxiliary loops 2 compensates for the unmeasured magnetic field beyond the extent of the sensor grid. Referring to FIG. 3d there is shown a portion of a prior art sensor grid array comprised of x and y loops. The extent of the tablet active area is indicated by the dashed line. As can be seen, the overlapping x and y coils are required to extend a considerable distance beyond the edge of the active area in order to minimize unmeasured magnetic fields beyond the edges of the active area.

In this regard, the algorithms developed for estimating pen 16 position and tilt are based upon infinite length coil models. However, and as was previously noted, when the pen 16 is positioned near the ends of finite coils, significant deviations from ideal signals may occur, particularly when the pen is tilted in both X and Y.

These deviations of the coil signals are significantly reduced by replacing the end portions of each coil with the auxiliary loops 2. In that the object of the auxiliary loops is to compensate for a missing coil area beyond the end of the coil, a triplet of auxiliary loops, as shown in FIG. 3b, provides the desired effect. For this embodiment the area enclosed by the auxiliary loop triplet 2 is approximately three times the area of the missing region of width (B). The area of the auxiliary loop triplet 2 is found by summing the areas enclosed by each of the three loops of the triplet.

The optimum geometry for the auxiliary loops 2 is a function of pen coil 18 geometry, the separation of the sensor grid 12a from the writing surface, and the type and location of magnetic shield 12b material.

In a presently preferred configuration the pen coil 18 is approximately 11 mm long and is located approximately 6 mm above the pen 16 tip. The distance between the sensor grid 12a and the writing surface is approximately 8 mm.

With no magnetic shield 12b, one suitable auxiliary loop 2 configuration is depicted in FIG. 3b, wherein the dimension A is 0.75 cm, dimension B is 0.65 cm and dimension C is 0.75 cm.

With a copper magnetic shield 12b spaced 0.040 inches from the sensor grid 12a, and using the same pen 16 specifications as detailed above, good performance is obtained with dimension B equal to 0.4 cm and dimension C equal to 0.5 cm.

Figure 6:
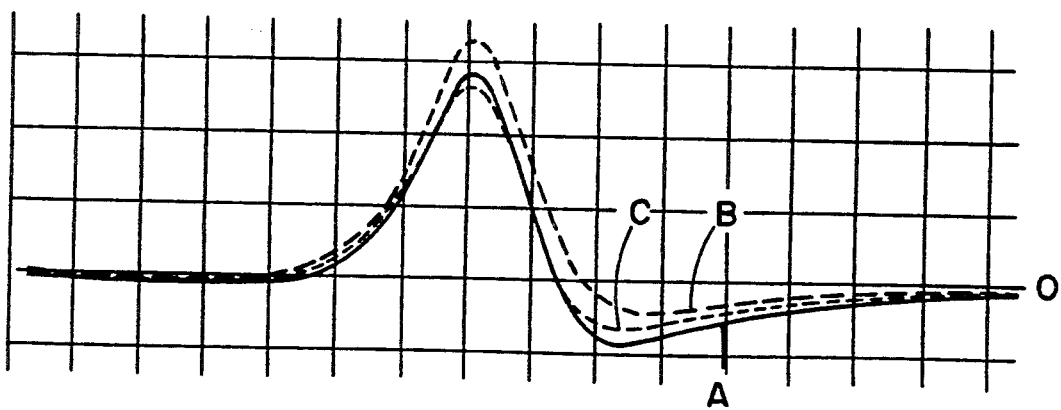
FIG. 6 illustrates three signal waveforms obtained from a non-differentially connected coil grid, wherein the signal trace labeled A represents a signal that would be obtained from a coil of infinite length, the signal trace labeled B represents that obtained from a coil of finite length, and the signal labeled C represents the signal obtained from a coil of finite length having auxiliary loops coupled at each end.

Referring to FIG. 6 there is shown three signal waveforms obtained from a non-differentially connected coil grid. The signal trace labeled A represents a signal that would be obtained from a coil of infinite length and thus represents an ideal signal. The signal trace labeled B represents that obtained from a coil of finite length, as is found in the prior art. The signal labeled C is that obtained from a coil of finite length having auxiliary loops 2 coupled at each end. As can be seen, the finite coil signal deviates significantly from the ideal, while the use of the auxiliary loops 2 provides a signal that more closely approaches the ideal.

The optimum geometry for the auxiliary loops 2, for a given application, is best identified through an iterative approach. A first step calculates ideal grid coil responses for a set of pen locations and orientations of interest. This first step employs an infinite coil model and is based on a five degree of freedom (x, y, z, alpha, beta) mutual inductance calculation. A second step calculates responses from an initial auxiliary loop 2 configuration, or first configuration. A third step modifies the initial configuration and calculates the responses of the modified configuration. The second and third steps incorporate an expected or required signal-to-noise ratio. The signal to noise ratio is employed to prevent this iterative approach from converging to a coil configuration that may be electrically correct but impractical for noise reasons. That is, the final geometry may include a large number of loops, each of which is susceptible to receiving environmental noise. A fourth step selects either the first configuration or the modified first configuration by comparing the results of each simulation to the ideal response determined in the first step. The selected best configuration is then modified, as in step 3, and the response of this modified model is calculated. This response is also compared to the ideal response and the configuration having a response that is nearest to the ideal is selected. As a result of many iterations of this technique the auxiliary loop model eventually converges to a model having a response that most closely approaches the previously determined ideal response, over the selected set of pen positions.

Figure 3E:
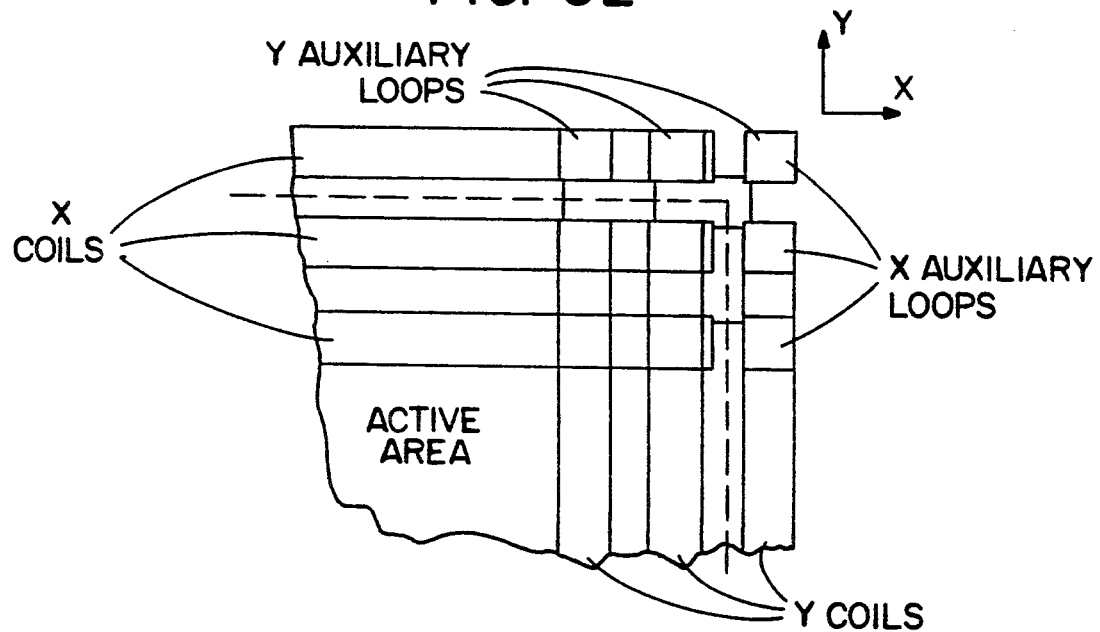
FIG. 3e illustrates sensor grid coils arranged in accordance with the teaching of the invention to include auxiliary loops disposed in a spaced apart relationship with ends of major loops.
Figure 3F:
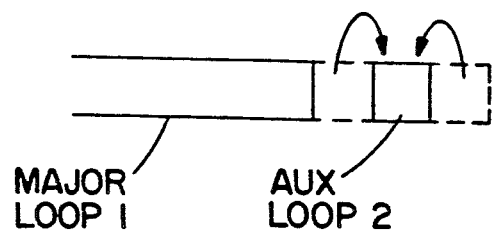
FIG. 3f illustrates a technique of folding the major loop to derive the auxiliary loop of FIG. 3b.

Referring to FIG. 3f there is shown a technique for constructing the auxiliary loop 2 of FIG. 3b. As can be seen, two portions of the major loop 1 are folded in on a central portion to form the auxiliary loop 2. This folding results in the three forward windings as seen in FIG. 3b.

The teaching of the invention is not limited to only an auxiliary loop triplet, as shown in FIG. 3b. For example, FIG. 3g illustrates a set of auxiliary loops comprised of five loops located at a terminal end of a coil and one reverse loop that connects the terminal end portion to the major loop.

Referring to FIG. 3e there is shown a portion of a tablet sensor grid constructed in accordance with the invention. As can be seen, the tablet active area is defined by overlapping x and y coils having the auxiliary loops disposed at their ends. A significant reduction in required area is achieved by the use of the x and y auxiliary loops which serve to fold, into a more compact geometry, a portion of each major loop that extends outside of the active area, while maintaining signal induction characteristics similar to those of the longer loop of FIG. 3d.

The auxiliary loops 2 need not be aligned symmetrically with the major loops 1. For example, FIG. 3h illustrates a further embodiment of the invention wherein a pair of differentially connected major loops 1 have a longitudinal axis of symmetry that passes therebetween. The centers of the auxiliary loops 2 are disposed further from the axis of symmetry than are the centers of the major loops 1. As an example, the spacing between centers of the major loops 1 is approximately 1.5 centimeters while the spacing between centers of the auxiliary loops 2 is approximately two centimeters.

Figure 4A:
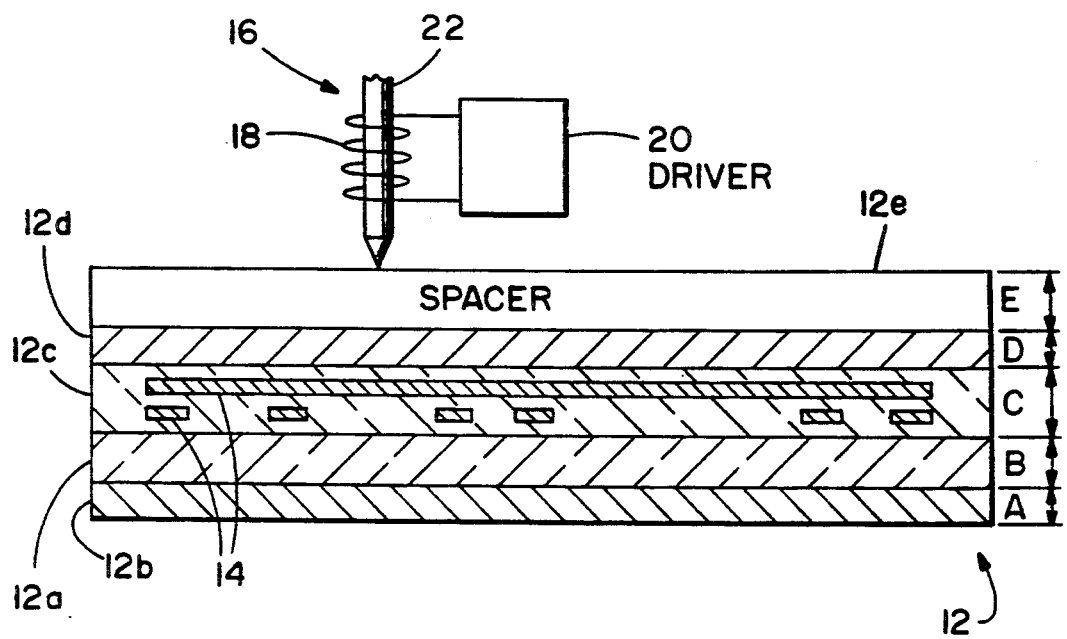
FIG. 4a is a cross-sectional view, not to scale, of a digitizer tablet that is constructed with a substrate, and a planar conductor disposed upon one surface of the substrate for providing magnetic shielding, and for a sensor grid disposed over an opposite surface of the substrate, the sensor grid being formed by a printing process.
Figure 4B:
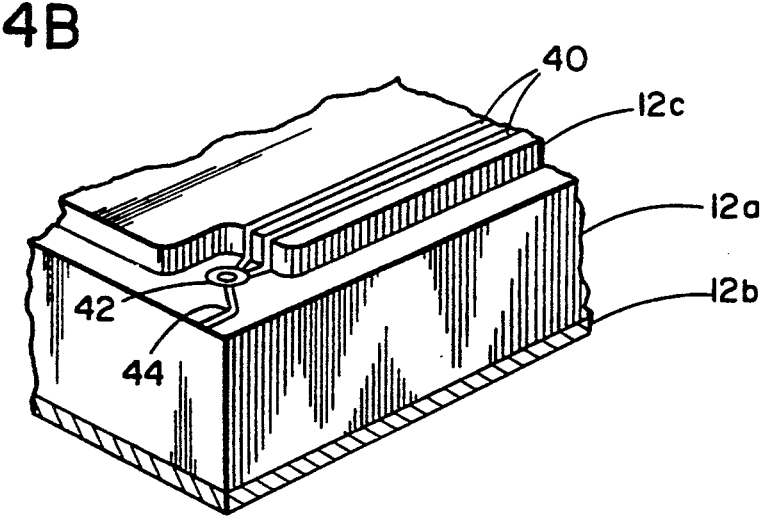

Referring to FIG. 4a there is shown a cross-sectional view of one presently preferred construction of the sensor grid 12. Sensor grid 12 includes a substrate 12a having on one surface a conductive plane 12b. On a surface opposite the surface having the conductive plane 12b there are formed two arrays of coil pairs 14, specifically the x-axis array 14a and the y-axis array 14b. Preferably, the coil pairs 14 are fabricated by a printing process, such as a silk screen process, to define electrically conductive traces on an electrically insulating material. Vias are provided for accommodating crossovers and similar structures so as to provide the overlapped, differentially interconnected coil pairs that comprise the arrays 14. Employing this technique, both the x-axis array 14a and the y-axis array 14b are built up within an insulating matrix 12c. Over a top surface further conducting material 12d is provided for electromagnetic interference (EMI) shielding. The writing surface 12e is spaced substantially above the the sensor array structure. In accordance with this embodiment, and as is also illustrated in FIG. 4b, the conductors are each comprised of linear patterns 40 of electrically conductive silver ink, each linear pattern having a width of approximately ten mils and disposed on 20 mil centers. The insulating matrix 12c is comprised of, by example, an acrylic or a latex ink. Conductive pads 42 are provided on the substrate 12a for contacting the linear patterns 40 for providing cross-overs and for coupling the linear patterns 40 to traces 4 connected to the multiplexers 26 and 28 (not shown). The conductive plane 12b functions as a magnetic shield and may be comprised of layer of copper that is approximately one mil thick. Aluminum may also be used if the thickness is increased to approximately three to approximately four mils. A layer of noble metal may also be employed. The magnetic shield may also be comprised of a a material that is significantly less electrically conductive than copper of the other embodiments described above. For example, a magnetic iron-nickel-base alloy, such as Mumetal, may be used. For Mumetal a thickness of approximately two mils has been found to provide suitable shielding. The substrate 12a may be comprised of conventional glass-epoxy printed circuit board material having a thickness of approximately 0.02 inches to approximately 0.04 inches.

Representative approximate dimensions of the sensor grid 12 of FIG. 4a, employing a magnetic shield comprised of copper, are as follows.

| DIMENSION | INCHES |
|---|---|
| A | 0.001 |
| B | 0.02 |
| C | 0.005 |
| D | 0.001 |
| E | 0.3 |

In accordance with an aspect of the invention the use of printing techniques to fabricate the sensor grid 12 enables positioning of the x-axis array 14a and the y-axis array 14b at substantially the same distance from the plane of the magnetic shield plane 12b. This enables a substantially equal amount of loss to be experienced by the signal within each of the arrays 14, the loss being due, in the case where the shield is electrically conductive, to cancellation of the signal by the shield 12b. The magnetic shield 12b may be grounded for EMI purposes, but is not required to be grounded to function as a magnetic shield. In determining the spacing between the magnetic shield 12b and the coils an important consideration is the overall thickness of the sensor grid 12 which, for applications such as a portable data entry device, is preferably as thin and lightweight as possible. As can be seen, the sensor grid 12 provided in accordance with FIG. 4a enables the magnetic shield 12b to be positioned to within 0.05 inches, or less, of the sensor grid coils.

Figure 4C:
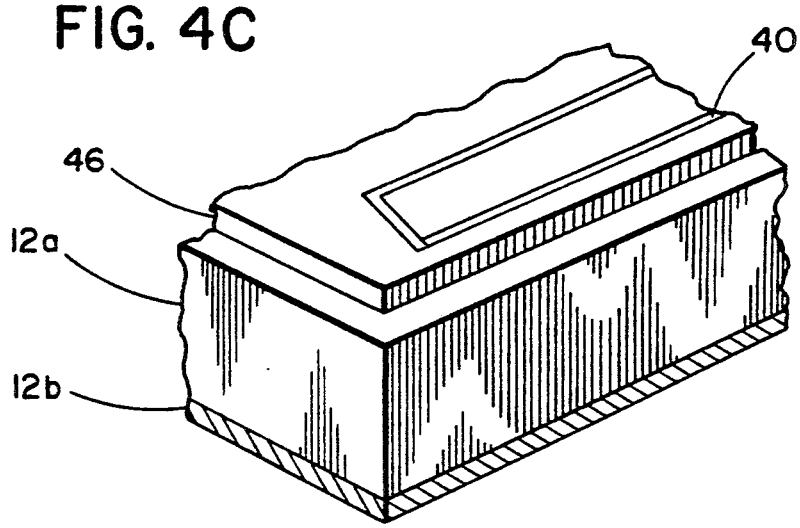
FIG. 4c, is a partial elevational view, not to scale, of a further digitizer tablet embodiment that is constructed using multilayer printed circuit technology.

A further embodiment of the invention is illustrated in the elevational view of FIG. 4c. For this embodiment a layer 46 of printed circuit board material is provided having the conductive patterns disposed on opposite sides thereof. This embodiment enables fabrication by conventional multilayer circuit board technology. For this embodiment the thickness of the substrate 12a is approximately 0.02 inches to 0.04 inches and the thickness of the layer 46 is approximately 0.005 inches so as to maintain the spacing between the x grid and the magnetic shield plane, and between the y grid and the magnetic shield plane, as close to the same value as possible. Any difference in signal attenuation between arrays 14a and 14b, due to spacing, may be compensated for with a correction applied by processor 30.

Although described in the context of a digitizer tablet that employs coil arrays to sense a magnetic field generated by a pen it should be realized that the teaching of the invention also applies to digitizer tablets that drive the coil arrays and sense a magnetic field with a pen coil. Aspects of the invention also apply to non-differentially connected coils. For example, the auxiliary loops may be employed with conventional, non-differentially connected coils. Also, the coil grid array fabrication techniques described above may also be employed with conventional, non-differentially connected coils.

Thus, while the invention has been particularly shown and described with respect to exemplary embodiments thereof, it will be understood by those skilled in the art that changes in form and details may be made therein without departing from the scope and spirit of the invention.

Having thus described my invention, what I claim as new, and desire to secure by Letters Patent is:

1. A digitizer tablet comprising a fixed array of inductors for use with an external moveable inductor and including means for determining a magnitude of a mutual inductance between the array of inductors and the moveable inductor, wherein the array of inductors is comprised of an x-axis array and a y-axis array, and wherein the x-axis array and the y-axis array are each comprised of a plurality of coil pairs, individual coils of each of the coil pairs being differentially connected one to another.

2. A digitizer tablet as set forth in claim 1 wherein the plurality of coil pairs within an array overlap one another.

3. A digitizer tablet as set forth in claim 1 wherein the x-axis array and the y-axis array are each fabricated adjacent to a first major surface of a common substrate, and wherein a second major surface of the common substrate, that is opposite the first major surface, has a planar magnetic shield disposed thereon.

4. A digitizer tablet as set forth in claim 1 wherein the x-axis array and the y-axis array each include a plurality of electrical conductors embedded within an insulating matrix.

5. A digitizer tablet as set forth in claim 3 wherein the x-axis array and the y-axis array each include a plurality of electrical conductors embedded within an insulating matrix, wherein the electrical conductors are comprised of an electrically conductive ink, and wherein the planar magnetic shield is comprised of a material selected from the group consisting essentially of copper, aluminum, a noble metal, a magnetic iron-nickel base alloy, and combinations thereof.

6. A digitizer tablet as set forth in claim 1 wherein each coil of a coil pair includes a major loop having a first end, the first end having a first plurality of auxiliary loops coupled thereto, and a second, opposing end having a second plurality of auxiliary loops coupled thereto.

7. A digitizer tablet as set forth in claim 6 wherein the plurality of auxiliary loops are each disposed adjacent to a periphery of the fixed array of inductors and outside of an active area of the fixed array of inductors.

8. A digitizer tablet as set forth in claim 6 wherein each of the plurality of auxiliary loops has a configuration selected to compensate for an unmeasured magnetic field beyond an end of the coil to which the plurality of auxiliary loops is coupled.

9. A digitizer tablet as set forth in claim 6 wherein the auxiliary loops are disposed in a spaced apart fashion from an end of the coil for defining a first area between the auxiliary loops and the end of the coil, and wherein a summation of the area enclosed by each loop of the auxiliary loops is approximately equal to three times the first area.

10. A digitizer tablet as set forth in claim 6 wherein each of the plurality of auxiliary loops is comprised of a first, outer loop, a second loop disposed within the first loop, and a third loop disposed within the second loop.

11. A digitizer tablet as set forth in claim 6 wherein a center of each of the coils of a coil pair are spaced apart from one another by a first distance, and wherein a center of each of the auxiliary loops connected to opposing ends of the coils are spaced apart by a second distance, and wherein the first distance equals the second distance.

12. A digitizer tablet as set forth in claim 11 wherein the first and the second distance are each approximately 1.5 centimeters.

13. A digitizer tablet as set forth in claim 6 wherein a center of each of the coils of a coil pair are spaced apart from one another by a first distance, and wherein a center of each of the auxiliary loops connected to opposing ends of the coils of a coil pair are spaced apart by a second distance, and wherein the first distance is less than the second distance.

14. A digitizer tablet as set forth in claim 13 wherein the first distance is approximately 1.5 centimeters, and wherein the second distance is approximately two centimeters.

15. A digitizer tablet as set forth in claim 6 wherein each of the coils has a width of approximately 0.75 centimeters, wherein the auxiliary loops are disposed at a distance of approximately 0.65 centimeters from an end of a coil, and wherein a largest loop of the auxiliary loops has a width of approximately 0.75 centimeters.

16. A digitizer tablet as set forth in claim 6 and further comprising a magnetic shield disposed approximately 0.04 inches from the fixed array of inductors, and wherein each of the coils has a width of approximately 0.75 centimeters, wherein the auxiliary loops are disposed at a distance of approximately 0.4 centimeters from an end of a coil, and wherein a largest loop of the auxiliary loops has a width of approximately 0.5 centimeters.

17. An array of inductors for use in a digitizer tablet, the array of inductors being disposed in a plane and defining an active area wherein a mutual inductance is sensed between the array of inductors and a moveable inductor, wherein the array of inductors is comprised of a first array defining an x-axis array and a second array defining a y-axis array, and wherein the x-axis array and the y-axis array are each comprised of a plurality of coils, wherein each coil includes a major loop having a first end, the first end having a first plurality of auxiliary loops coupled thereto, and a second, opposing end having a second plurality of auxiliary loops coupled thereto.

18. An array of inductors as set forth in claim 17 wherein the coils are arranged as coil pairs wherein individual coils of each of the coil pairs are differentially connected one to another.

19. An array of inductors as set forth in claim 18 wherein the plurality of coil pairs within an array overlap one another.

20. An array of inductors as set forth in claim 17 wherein the x-axis array and the y-axis array are each fabricated adjacent to a first major surface of a common substrate, and wherein a second major surface of the common substrate, that is opposite the first major surface, has a planar magnetic shield disposed thereon.

21. An array of inductors as set forth in claim 17 wherein the x-axis array and the y-axis array each include a plurality of electrical conductors embedded within an insulating matrix.

22. An array of inductors as set forth in claim 21 and including a planar magnetic shield that is spaced apart from the plane of the array of inductors, wherein the electrical conductors are comprised of an electrically conductive ink, and wherein the planar magnetic shield is comprised of a material selected from the group consisting essentially of copper, aluminum, a noble metal, a magnetic iron-nickel base alloy, and combinations thereof.

23. An array of inductors as set forth in claim 17 wherein the plurality of auxiliary loops are each disposed adjacent to a periphery of the fixed array of inductors and outside of the active area.

24. An array of inductors as set forth in claim 17 wherein each of the plurality of auxiliary loops has a configuration selected to compensate for an unmeasured magnetic field beyond an end of the coil to which the plurality of auxiliary loops is coupled.

25. An array of inductors as set forth in claim 17 wherein each of the plurality of auxiliary loops is disposed in a spaced-apart fashion from an end of the coil for defining a first area between the auxiliary loops and the end of the coil, and wherein a summation of the area enclosed by each loop of the auxiliary loops is approximately equal to three times the first area.

26. An array of inductors as set forth in claim 17 wherein each of the plurality of auxiliary loops is comprised of a first, outer loop, a second loop disposed within the first loop, and a third loop disposed within the second loop.

27. An array of inductors as as set forth in claim 18 wherein a center of each of the coils of a coil pair are spaced apart from one another by a first distance, and wherein a center of each of the auxiliary loops connected to opposing ends of the coils are spaced apart by a second distance, and wherein the first distance equals the second distance.

28. An array of inductors as set forth in claim 27 wherein the first and the second distance are each approximately 1.5 centimeters.

29. An array of inductors as set forth in claim 18 wherein a center of each of the coils of a coil pair are spaced apart from one another by a first distance, and wherein a center of each of the auxiliary loops connected to opposing ends of the coils of a coil pair are spaced apart by a second distance, and wherein the first distance is less than the second distance.

30. An array of inductors as set forth in claim 29 wherein the first distance is approximately 1.5 centimeters, and wherein the second distance is approximately two centimeters.

31. An array of inductors as set forth in claim 17 wherein each of the coils has a width of approximately 0.75 centimeters, wherein the auxiliary loops are disposed at a distance of approximately 0.65 centimeters from an end of a coil, and wherein a largest loop of the auxiliary loops has a width of approximately 0.75 centimeters.

32. An array of inductors as set forth in claim 17 and further comprising a magnetic shield disposed within a distance of equal to or less than approximately 0.05 inches from the fixed array of inductors.

33. An array of inductors as set forth in claim 32 wherein each of the coils has a width of approximately 0.75 centimeters, wherein the auxiliary loops are disposed at a distance of approximately 0.4 centimeters from an end of a coil, and wherein a largest loop of the auxiliary loops has a width of approximately 0.5 centimeters.

34. An array of conductors for use in a digitizer tablet, the array of conductors being comprised of a first array of coils defining an x-axis array and a second array of coils defining a y-axis array, wherein the coils of the x-axis array and the y-axis array are defined in part by electrically conductive patterns embedded within an insulating matrix, the matrix being disposed upon a first surface of a substrate, and wherein the first surface of the substrate includes electrically conductive regions formed thereon, the regions being conductively coupled to the electrically conductive patterns.

35. An array of conductors as set forth in claim 34 wherein the coils are comprised of an electrically conductive ink.

36. An array of conductors as set forth in claim 34 and further comprising a magnetic shield disposed upon a second surface of the substrate.

37. An array of conductors as set forth in claim 36 wherein the substrate has a thickness equal to or less than approximately 0.05 inches.

38. An array of conductors as set forth in claim 36 wherein the magnetic shield is comprised of a material selected from the group consisting essentially of copper, aluminum, a noble metal, a magnetic iron-nickel base alloy, and combinations thereof.

39. An array of conductors as set forth in claim 34 wherein each coil includes a major loop having a first end, the first end having a first plurality of auxiliary loops coupled thereto, and a second, opposing end having a second plurality of auxiliary loops coupled thereto.

40. An array of conductors as set forth in claim 34 wherein the coils are arranged as coil pairs wherein individual coils of each of the coil pairs are differentially connected one to another.

41. An array of conductors for use in a digitizer tablet, said array being comprised of a plurality of coil pairs disposed over a surface of a substrate, individual coils of each of the coil pairs being differentially connected one to another.

42. An array of conductors as set forth in claim 41 wherein each coil of a coil pair includes a major loop having a first end, the first end having a first plurality of auxiliary loops coupled thereto, and a second, opposing end having a second plurality of auxiliary loops coupled thereto, wherein the plurality of auxiliary loops are each disposed adjacent to a periphery of the array of conductors are outside of an active area of the array of conductors, and wherein each of the plurality of auxiliary loops has a configuration selected to compensate for an unmeasured magnetic field beyond an end of the coil to which the plurality of auxiliary loops is coupled.

43. An array of conductors as set forth in claim 41 wherein each coil of a coil pair has a length that is greater than a width, wherein the two coils of a coil pair are disposed in a parallel manner one to another, wherein each coil of a coil pair has a width of approximately one centimeter, and wherein the two coils of a coil pair are spaced apart from one another by approximately 0.5 centimeters.

44. An array of conductors as set forth in claim 41 wherein each of the plurality of coil pairs is switchably coupled to means for reading out a magnitude of a signal induced into the coil pair by a moveable coil.

* * * * *